United States Patent
Shida et al.

(10) Patent No.: US 7,269,340 B2
(45) Date of Patent: Sep. 11, 2007

(54) MPEG DATA RECORDER INCLUDING AN MPEG DATA RATE DETECTOR

(75) Inventors: Tetsuro Shida, Tokyo (JP); Kenji Tsunashima, Tokyo (JP); Hideaki Kosaka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1237 days.

(21) Appl. No.: 09/988,047

(22) Filed: Nov. 16, 2001

(65) Prior Publication Data

US 2002/0067915 A1 Jun. 6, 2002

(30) Foreign Application Priority Data

Dec. 4, 2000 (JP) ............................. 2000-368420

(51) Int. Cl.
*H04N 7/26* (2006.01)
(52) U.S. Cl. ...................................... 386/111; 386/124
(58) Field of Classification Search ................ None
See application file for complete search history.

(56) References Cited

U.S. PATENT DOCUMENTS

| | | | |
|---|---|---|---|
| 6,128,316 A | 10/2000 | Takeda et al. | |
| 6,266,346 B1 | 7/2001 | Takeda et al. | |
| 6,587,477 B1 | 7/2003 | Takeda et al. | |
| 6,934,818 B2* | 8/2005 | Okada ...................... | 711/154 |
| 6,996,332 B1* | 2/2006 | Hamada .................... | 386/124 |

FOREIGN PATENT DOCUMENTS

| | | |
|---|---|---|
| JP | 08-339630 A | 12/1996 |
| JP | 9-46390 A | 2/1997 |
| JP | 11-355294 A | 12/1999 |

OTHER PUBLICATIONS

Fujita et al., "Newly Developed D-VHS Digital Tape Recording . . . ", *IEEE Transactions On Consumer Electronics*, vol. 42, No. 3, Aug. 1996, pp. 617-622.

* cited by examiner

*Primary Examiner*—Thai Q. Than
*Assistant Examiner*—Heather R. Jones
(74) *Attorney, Agent, or Firm*—Birch, Stewart, Kolasch & Birch, LLP (57) ABSTRACT

An MPEG data recorder comprises an interface means for receiving a data packet from a digital transmission line transmitting MPEG data in real time, and extracting a predetermined MPEG data from a received packet to output it as a data signal; a data rate detector means for determining a data rate of MPEG data based on a valid data period, during which the data signal is outputted from the interface means; and a recording mode selector means for selecting a recording mode based on the determined data rate.

According to such a configuration, the data rate of MPEG data can be detected without a necessity of analyzing the MPEG data, which would require an MPEG system layer decoder, and thereby an MPEG data recorder can be obtained, in which MPEG data are recorded efficiently in a proper recording mode, with a simplified circuit configuration.

8 Claims, 12 Drawing Sheets

ISOCHRONOUS PACKET

MPEG DATA RECORDER INCLUDING AN MPEG DATA RATE DETECTOR

This nonprovisional application claims priority under 35 U.S.C. § 119(a) on Patent Application No. 2000-368420 filed in Japan on Dec. 4, 2000, which is herein incorporated by reference.

BACKGROUND OF THE INVENTION

1. Field of the Invention

The present invention relates to an MPEG data recorder, and more particularly, relates to an MPEG data recorder, which selects a recording mode in accordance with a data-rate and records the MPEG data transmitted in real time through a digital transmission line such as IEEE 1394.

2. Description of the Related Art

It is possible to record digital data on a magnetic medium, which is one of recording media, by using a D-VHS (Digital-VHS) recorder. In this case, since the amount of consumed tape increases as the data rate of data to be recorded becomes higher, a plurality of recording modes for the different conveying speeds of the tape are defined in the D-VHS standard. Accordingly, it is possible to select a proper tape speed to improve the efficiency of usage (recording) of magnetic tape, by selecting a recording mode in accordance with the data rate.

As the recording modes for D-VHS, HS mode of 28.2 Mbps (bit/sec), STD mode of 14.1 Mbps, LS3 mode of 4.7 Mbps, LS5 mode of 2.8 Mbps, etc., have been defined. For example, when MPEG transport stream (MPEG-TS) data are to be recorded with a D-VHS recorder, if its data rate of the MPEG-TS to be recorded is 4 Mbps, it is preferable to record in LS3 mode, because it would be impossible to record in LS5 mode, while it would consume excessive tapes in HS mode or STD mode.

When MPEG-TS data are to be recorded in the D-VHS recorder, the maximum data rate of the MPEG-TS data is determined for selecting a recording mode. This maximum data rate can be determined by analyzing a descriptor, which has been multiplexed to an MPEG-TS.

Figure 12:
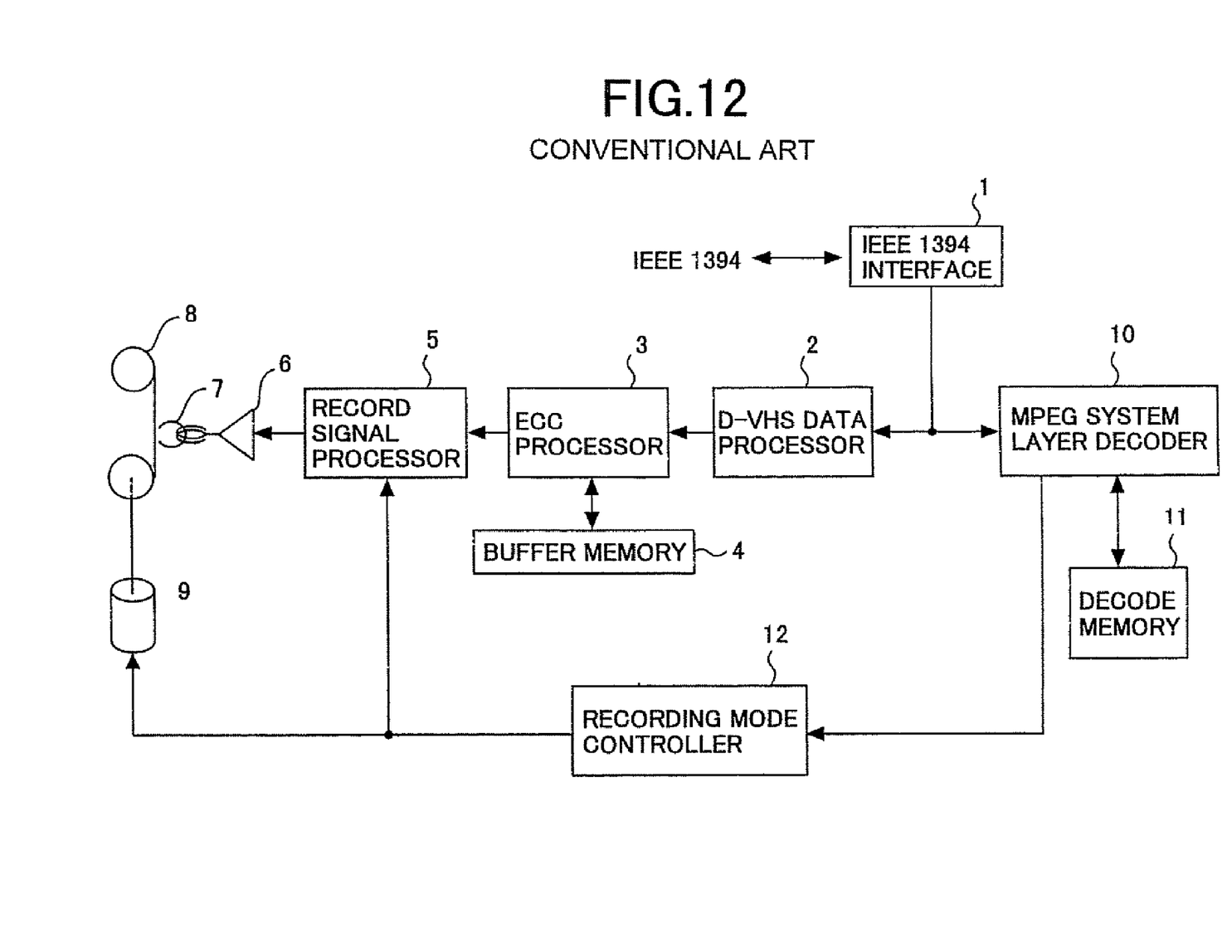
FIG. 12 is a block diagram showing an example of the structure of an existing MPEG data recorder.

FIG. 12 is a diagram of an example of the structure of an MPEG data recorder, and showing an outline of the structure of a D-VHS recorder, which records the MPEG-TS data transmitted in real time through an IEEE 1394. In the figure, numeral 1 denotes an IEEE 1394 interface unit; 2 denotes a D-VHS data processor; 3 denotes an ECC processor; 4 denotes a buffer memory for the ECC process; 5 denotes a record signal processor; 6 denotes a record amplifier; 7 denotes a recording head; 8 denotes a magnetic tape; 9 denotes a motor driver; 10 denotes an MPEG system layer decoder; 11 denotes a decode memory; and 12 denotes a recording mode controller, respectively.

The IEEE 1394 interface unit 1, which is connected with an IEEE 1394 link, transmits and receives asynchronous data such as control commands and isochronous data such as MPEG-TS. The interface unit 1, on receiving MPEG-TS data via the IEEE 1394 link, supplies the MPEG-TS data to the D-VHS data processor 2 and the MPEG system layer decoder 10.

The format of MPEG-TS data outputted from the interface unit 1 is converted in the D-VHS data processor 2, and an error correction code is added to the data in the ECC processor 3. Then, MPEG-TS data are subjected to a predetermined signal processing in the record signal processor 5, amplified by the record amplifier 6, and recorded on the magnetic tape 8 by the recording head 7. The conveying speed of the magnetic tape 8 is controlled by the motor driver 9.

On the other hand, MPEG-TS data outputted from the interface unit 1 is analyzed in the MPEG system layer decoder 10, in which program specific information (PSI) and service information (SI) are extracted. The decode memory 11 is a memory for temporarily expanding the data when the MPEG system layer decoder 10 analyzes the PSI and SI. The recording mode controller 12 detects the bit rate of MPEG-TS to select a recording mode, based on the PSI and SI analyzed by the decoder 10. Since, in the D-VHS standard, the recording modes are classified by the conveying speed of the magnetic tape 8, the motor driver 9 controls variably the conveying speed of the magnetic tape 8 to adapt for the selected recording mode.

When MPEG-TS data are those which have been inputted from an IEEE 1394 link, the data rate shows various values. For example, in the case of BS digital broadcast, it gives about 26 Mbps in HDTV program, and it gives about 6 Mbps in SDTV program. Furthermore, in the case of CS digital broadcast, it ranges from about 4 Mbps to about 6 Mbps, or it could be up to about 20 Mbps when MPEG-TS data carried on a broadcasting wave are to be recorded directly. These values can be obtained directly or indirectly by detecting and analyzing the information, called a descriptor, contained within the MPEG-TS.

MPEG-TS data outputted from the IEEE 1394 interface unit 1 are inputted to the MPEG system layer decoder 10, expanded into the decode memory 11, and subjected to a demultiplexing process of multiplexed information (Demux process). In this process, the maximum data rate information of the transmitted MPEG-TS data can be obtained, by analyzing the descriptor named a maximum bitrate descriptor, which has been inserted, e.g., into the PMT (program map table) multiplexed to the MPEG-TS data. The data rate information, thus obtained by the MPEG system layer decoder 10, are supplied to the recording mode controller 12. The recording mode controller 12 selects the most proper recording mode, in which MPEG-TS data are to be recorded, based on the obtained data rate information, and the motor driver 9 adjusts the tape-conveying speed in accordance with the recording mode.

In such an MPEG data recorder as described heretofore, the recording mode is selected by detecting the data rate of MPEG-TS data with using the system layer decoder. Namely, the MPEG-TS system layer decoder is required for selecting a recording mode. However, in the case an MPEG data recorder having no such a decoder employed, as in a low-price D-VHS device, there is a problem that the data rate of MPEG-TS data cannot be detected and thereby the selection of recording mode would be impossible.

In such a recorder having no system layer decoder, since the recording mode is selected independently of the data rate of MPEG data, it is necessary to record all the MPEG data in a recording mode of the highest data rate, e.g., HS mode of 28.2 Mbps. If the actual data rate of MPEG data is low, almost all of the D-VHS formatted data, which have been recorded on a magnetic tape, are redundant (stuffing) data, and thereby it leads to a problem of very low recording efficiency.

SUMMARY OF THE INVENTION

An object of the present invention is to provide an MPEG data recorder, which records MPEG data in the most proper recording mode by detecting the data rate of MPEG data, with eliminating the necessity of analyzing PSI and SI of the MPEG data, which would require an MPEG system layer decoder. That is, the object of the present invention is to provide an MPEG data recorder, which selects a proper recording mode with a simplified circuit configuration without an MPEG system layer recorder, and records efficiently MPEG data transmitted from a digital transmission line in real time.

An MPEG data recorder realizing the above-stated object according to the present invention comprises: an interface means for receiving a data packet from a digital transmission line that transmits MPEG data in real time, extracting predetermined MPEG data from the received packet, and outputting the MPEG data as a data signal; a data rate detector means for detecting a data rate of the MPEG data for a period of time during the data signal being outputted from the interface means; and a recording mode selector means for selecting a recording mode based on the detected data rate.

DETAILED DESCRIPTION OF THE PREFERRED EMBODIMENTS

Embodiment 1

Figure 1:
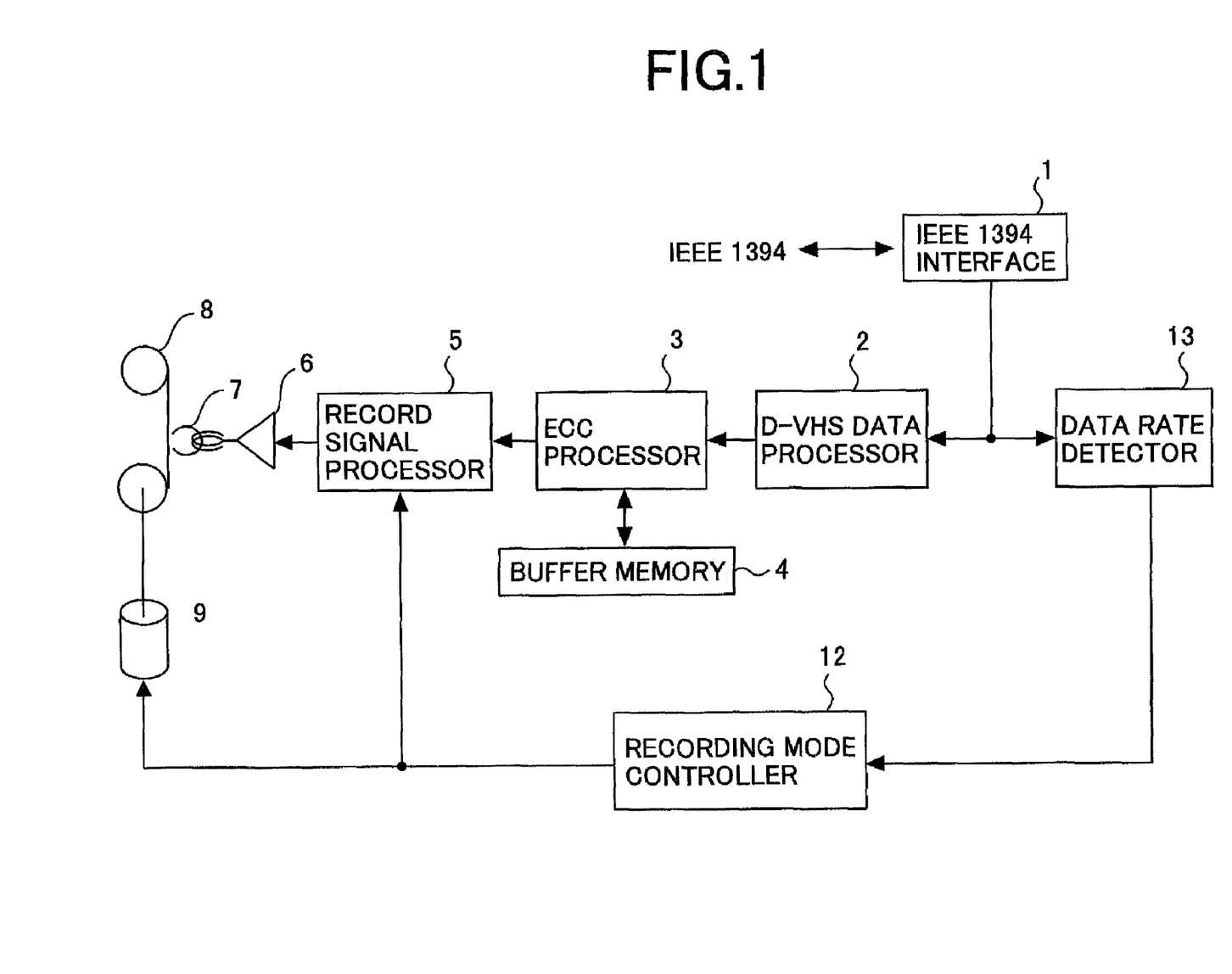
FIG. 1 is a block diagram showing an example of the structure of an MPEG data recorder, Embodiment 1, according to the present invention.

FIG. 1 is a block diagram showing an example of the structure of an MPEG data recorder, Embodiment 1, according to the present invention. In the figure, numeral 1 denotes an IEEE 1394 interface unit; 2 denotes a D-VHS data processor; 3 denotes an ECC processor; 4 denotes a buffer memory for the ECC process; 5 denotes a record signal processor; 6 denotes a record amplifier; 7 denotes a recording head; 8 denotes a magnetic tape; 9 denotes a motor driver; 12 denotes a recording mode controller; and 13 denotes a data rate detector, respectively.

The interface unit 1 outputs a transmission control signal indicating that MPEG-TS data are being outputted, and the data rate detector 13 detects the data rate of MPEG-TS based on the transmission control signal. The recording mode controller 12 selects a recording mode based on the data rate, and inform it to the motor driver 9. Accordingly, it is possible to control variably the conveying speed of the magnetic tape 8 based on the data rate of MPEG-TS data, even if an MPEG system layer decoder is not provided.

The interface unit 1 is connected with an IEEE 1394 link, and performs a communication of asynchronous data such as control commands and isochronous data such as MPEG-TS, by transmitting to and receiving from the other devices connected with the IEEE 1394 link, e.g., an STB (set top box) for BS or CS digital broadcast. The interface unit 1, on receiving an isochronous packet including MPEG-TS data from an MPEG data supplying device connected with the IEEE 1394 link, extracts MPEG-TS data from the received packet and supplies the data to the D-VHS data processor 2. When the MPEG-TS data are outputted, the interface unit 1 feeds a transmission control signal, indicating that valid data are being outputted, to the data rate detector 13.

Figure 2A:
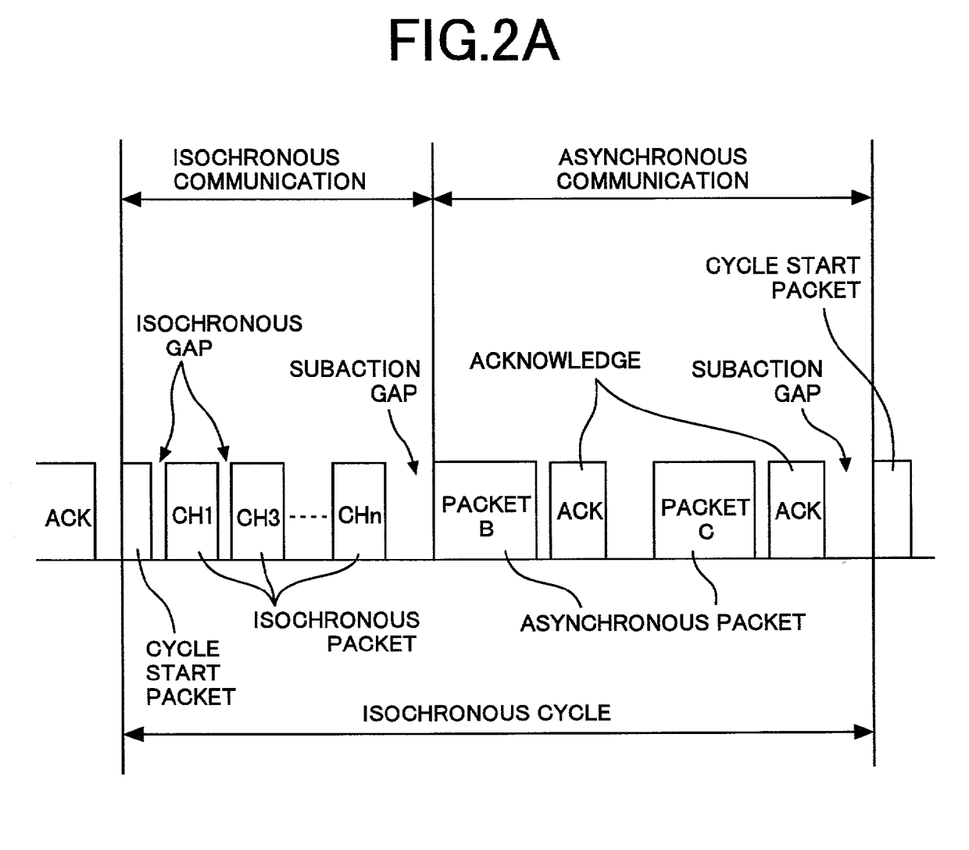
FIGS. 2A-2D are illustrative diagrams for exemplifying the outline of an operation of the interface unit 1 in FIG. 1.
Figure 2B:
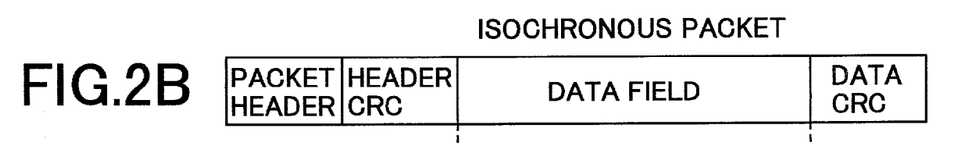
Figure 2C:
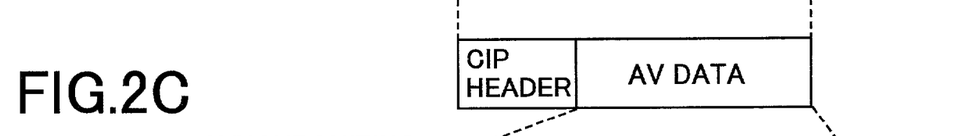
Figure 2D:
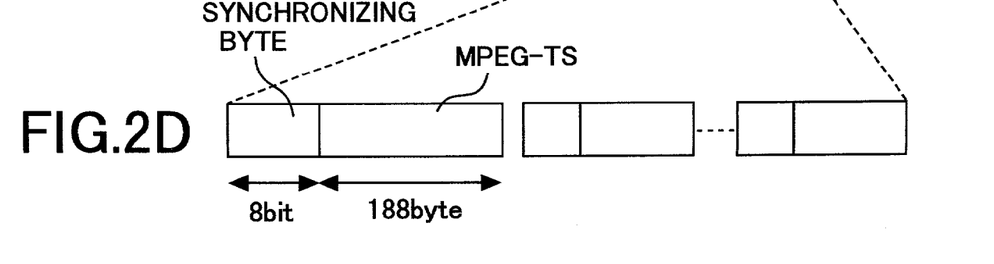

FIGS. 2A-2D are illustrative diagrams for exemplifying the outline of an operation of the interface unit 1. FIG. 2A shows a timing chart of the input signal from the IEEE 1394 link; FIG. 2B shows the structure of an isochronous packet; FIG. 2C shows the structure of a data field of the isochronous packet; and FIG. 2D shows the data signals outputted from the interface unit 1, respectively.

In the IEEE 1394, isochronous communication for real time transmission and asynchronous communication for asynchronous data transmission are defined. That is, isochronous packets and asynchronous packets are intermingled on an IEEE 1394 link, where the image signals such as MPEG-TS data to be transmitted in real time are contained in the isochronous packets.

An isochronous communication is performed by transmitting one or more isochronous packets in synchronization with a cycle start packet, which is transmitted from the cycle master at a constant interval, and the interval is called an isochronous cycle (the nominal cycle interval being 125 μsec). When two or more channels' data are to be transmitted, the packets are transmitted one channel after another with inserting an isochronous gap between them. On the other hand, asynchronous communication is performed during the period when the isochronous communication is not performed (See FIG. 2A).

An isochronous packet is composed of a packet header, a header CRC (cyclic redundancy check character), a data field and a data CRC. In the packet header, 6 bit signal of channel number (0-63) or others is contained, and in the header CRC and the data CRC, redundant codes for error correction are contained (See FIG. 2B). The interface unit 1 analyzes the packet header, distinguishes the channel number, and receives selectively only packets of the pre-assigned channel.

A data field is composed of a CIP (common isochronous packet) header and AV data. Image and voice data are contained as the AV data, and in the CIP header the attribute of the AV data is contained, the attribute including the data required when the AV data are reproduced (See FIG. 2C). The interface unit 1 joins the AV data together based on the CIP header to produce MPEG-TS data. The produced MPEG-TS data are outputted as an MPEG-TS packet of 188-byte data having an 8-bit synchronizing byte (hexadecimal "47") appended.

The interface unit 1 thus extracts MPEG-TS data from the transmission data carried on the IEEE 1394 link, and outputs the data as a data signal to the D-VHS data processor 2. At the same time, a reference clock signal is outputted, as the reference for the data signals. Furthermore, a transmission control signal indicating that the data signals are being transmitted is also outputted to the data rate detector 13.

MPEG-TS data outputted from the interface unit 1 are converted into the data format (D-VHS data) in conformity with the D-VHS standard, in the D-VHS data processor 2, and an ECC (error correction code) is added to the D-VHS data in the ECC processor 3. This ECC process is performed with expanding the format-converted MPEG-TS data into the buffer memory 4. D-VHS data with ECC added are subjected to a PRML and other processes, and converted into a record signal form, in which the record signal can be recorded on magnetic tape in the record signal processor 5. This record signal is amplified by the record amplifier 6 and recorded on the magnetic tape 8 by the recording head 7. The conveying speed of the magnetic tape 8 is controlled by the motor driver 9.

The data rate detector 13 discriminates between the valid data period that MPEG-TS data are outputted from the interface unit 1 and the invalid data period that the data are not outputted, based on the transmission control signal inputted from the interface unit 1, calculates the percentage occupied by the valid data period in the total period, and determines the data rate of MPEG-TS data inputted from the IEEE 1394 link, on the basis of the calculated percentage and the signal transmitting rate of the interface unit 1 (the transmitting rate when MPEG-TS signals are outputted).

In order to transmit MPEG-TS data, at least the data signal and the clock signal (reference clock) as the reference for the data signal are required. Therefore, additionally to MPEG-TS data signal, a reference clock signal is inputted generally from the interface unit 1. However, this need not apply in case the reference clock signal is generated within the data rate detector 13 or has been generated by some device other than the interface unit 1.

In the case that the interface unit 1 outputs MPEG-TS data with referring to the reference clock generated within its own unit, the data rate detector 13 can detect the frequency of the reference clock generated by the interface unit 1, by counting the reference clock generated by the interface unit 1 with referring to the clock specific to the detector, or by counting the specific clock with referring to the reference clock generated by the interface unit 1. On the contrary, in the case that the data rate detector 13 provides the reference clock to the interface unit 1, the frequency of the reference clock has already been known to the data rate detector 13.

If the frequency of the reference clock can be detected or is already known, the data rate detector 13 can determine the length of valid data period and that of invalid data period, and thereby can calculate the percentages of the valid and invalid data periods. That is, the percentage occupied by the valid data period in the total period for detection, i.e., the total of the valid and invalid data periods, is given by the following equation:

Percentage of valid data period={valid data period/ (valid data period+invalid data period)}.

The signal transmitting rate of the interface unit 1 is given by the product of frequency of the reference clock and the number of MPEG-TS bits (typically a width of transmitting bits) transmitted during one clock period (typically one cycle of the reference clock). The number of MPEG-TS bits depends on the form of connection between the interface unit 1 and the D-VHS data processor 2. For example, when those are connected by a general serial connection, the transmittable data in one clock period is one bit, while when those are connected by an 8-bit parallel connection, the transmittable data in one clock period is eight bits. Accordingly, the data rate of MPEG data is given by the following equation:

Data rate of MPEG data=(transmittable bit count in one clock period)×(frequency of clock signal)× {valid data period/(valid data period+invalid data period)}.

The data rate information of MPEG-TS data, which have been calculated in the data rate detector 13, are supplied to the recording mode controller 12. The recording mode controller 12 selects the most proper recording mode, in which the MPEG-TS data are to be recorded, based on the calculated data rate information, and outputs a mode control signal to the motor driver 9, the D-VHS data processor 2 and the record signal processor 5.

The D-VHS data processor 2 inserts a code of the selected recording mode into an area for indicating a recording mode in the D-VHS data format. The record signal processor 5 adjusts the reference frequency of the record signal based on the mode control signal. The motor driver 9 drives the magnetic tape 8 so that the conveying speed corresponds to the selected recording mode, based on the mode control signal.

According to the above-described embodiment, the transmission control signal indicating that MPEG-TS data are being transmitted is outputted from the interface unit 1, and the data rate of MPEG-TS data is detected based on the transmission control signal. Since the recording mode to be taken when the data are recorded can be changed in accordance with the data rate, it is possible to make the best use of the recording tapes.

Here, the transmission control signal according to this embodiment is composed of one or more signals, which may be a reference clock signal synchronized with the data signal and the other signals, but it should not be limited to include the reference clock signal therein. The transmission control signal may be also generated by superimposing the information signal on the reference clock signal.

Here, the recording mode stands for an operation mode of the MPEG data recorder, which can be selected in accordance with the data rate of MPEG data. The MPEG data recorder may be any apparatus, which can record MPEG data transmitted in real time through a digital transmission line, and the MPEG data recorder should not be limited to a D-VHS recorder, and the digital transmission line should not be limited to an IEEE 1394 link.

When the recording mode controller 12 determines a recording mode based on the data rate calculated by the data rate detector 13, it is preferable to select a recording mode with leaving some margin to the upper limit of the data rate in each recording mode, for taking into account the control information to be added for recording, the data for trick-play, etc. The amount of margin to be given may be also determined, with additionally taking into consideration the precision of the detected data rate, the working range of variable rates, etc. For example, in STD mode (maximum recording rate: 14.1 Mbps), it is preferable to select a mode with regarding the maximum rate available for recording to be about 11-12 Mbps.

Embodiment 2

Figure 3:
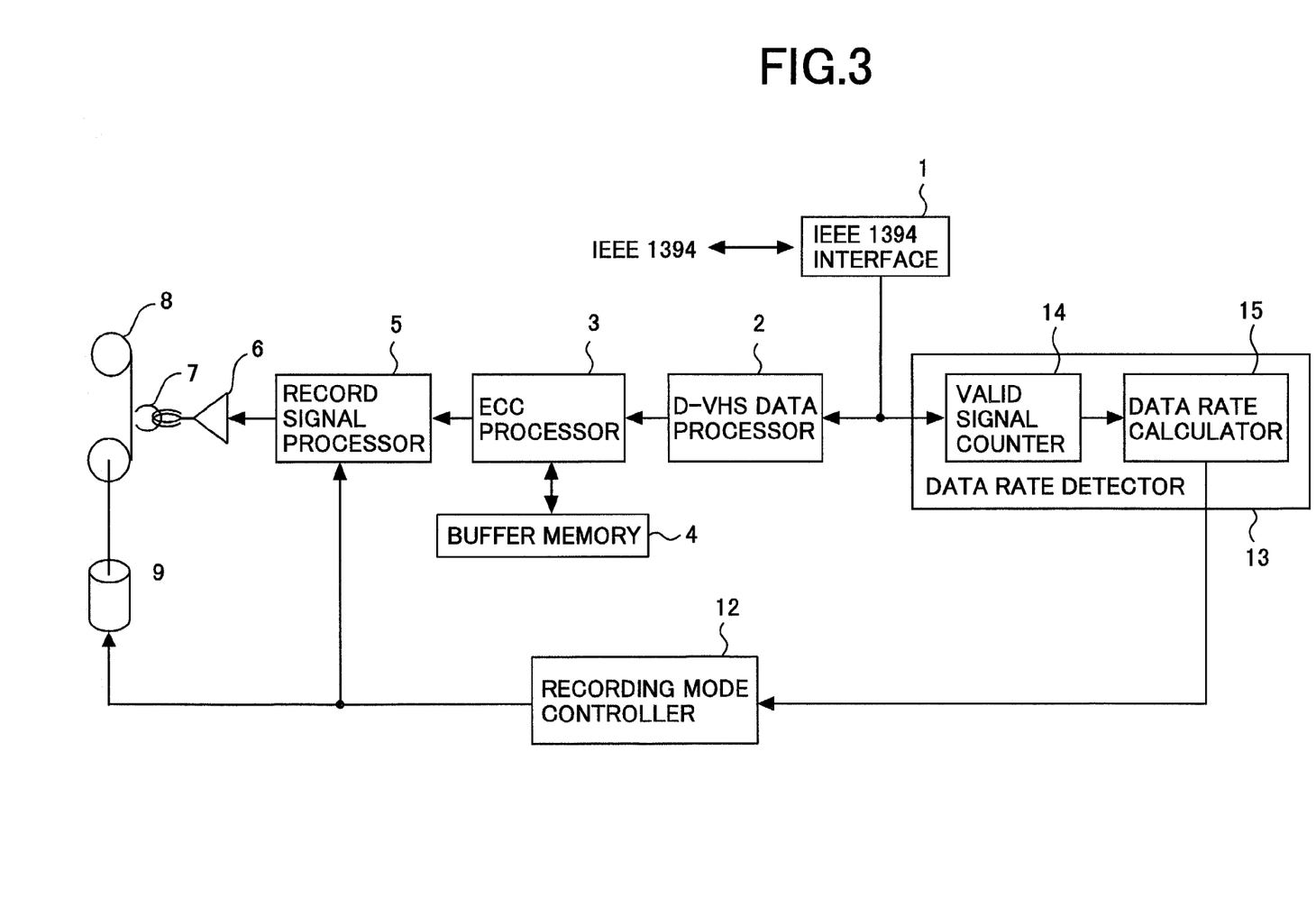
FIG. 3 is a block diagram showing another example of the structure of an MPEG data recorder, Embodiment 2, according to the present invention.

FIG. 3 is a block diagram showing another example of the structure of an MPEG data recorder, Embodiment 2, according to the present invention, and is describing a structural example of the data rate detector 13 in FIG. 1. The data rate detector 13 according to this embodiment is composed of a valid signal counter 14 and a data rate calculator 15. The valid signal counter 14 counts the length of valid data period and that of invalid data period, while the data rate calculator 15 determines the data rate of MPEG-TS data based on the percentages of those count values.

Figure 4:
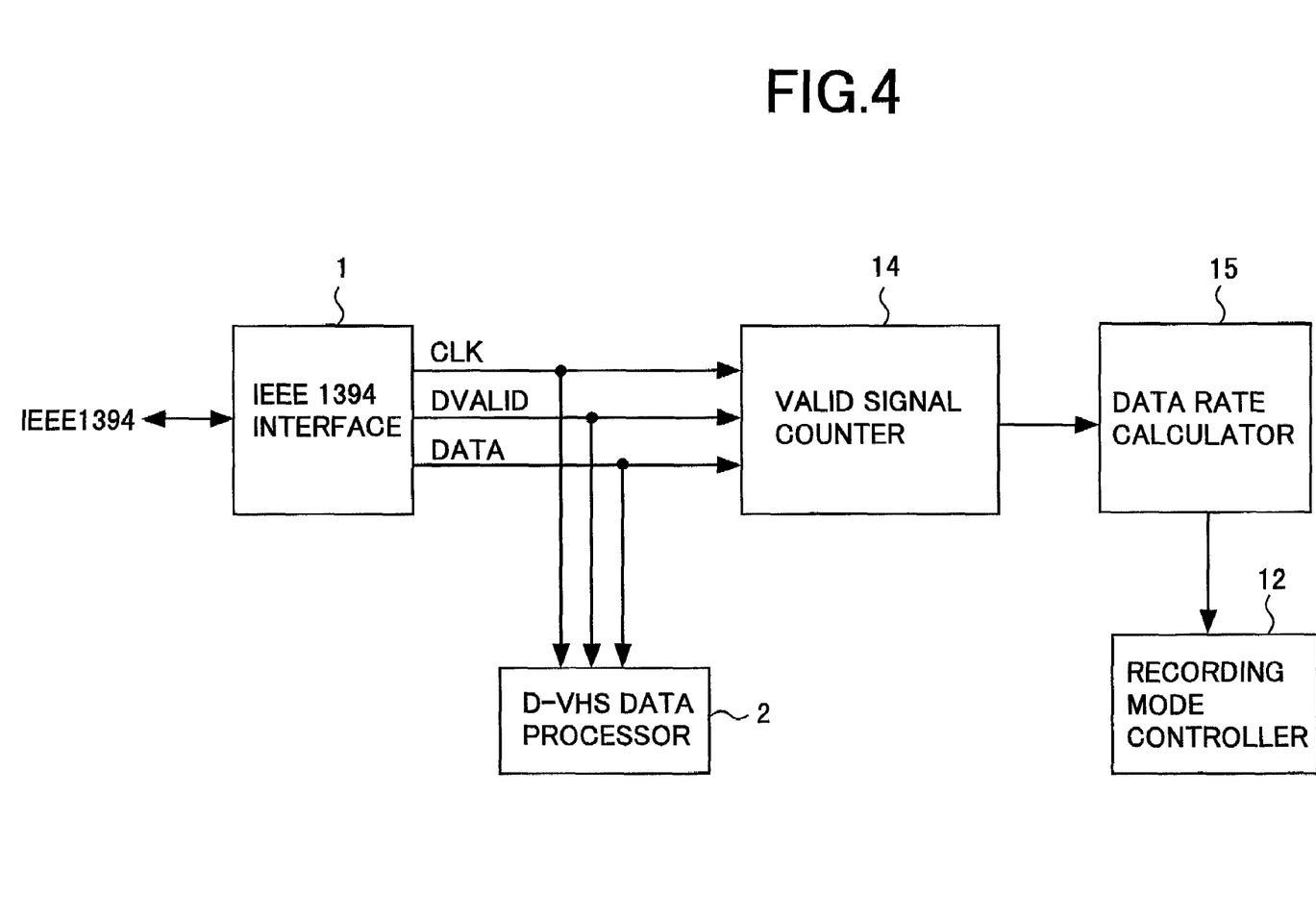
FIG. 4 is a block diagram of essential parts in FIG. 3.

FIG. 4 is a block diagram of essential parts in FIG. 3, and is showing signals being transmitted between the interface unit 1, the D-VHS data processor 2 and the valid signal counter 14. MPEG-TS data outputted from the interface unit 1 are transmitted as a data signal DATA, a reference clock signal CLK and a data validity signal DVALID, those signals being outputted from the interface unit 1 to the D-VHS data processor 2 and the valid signal counter 14.

Figure 5:
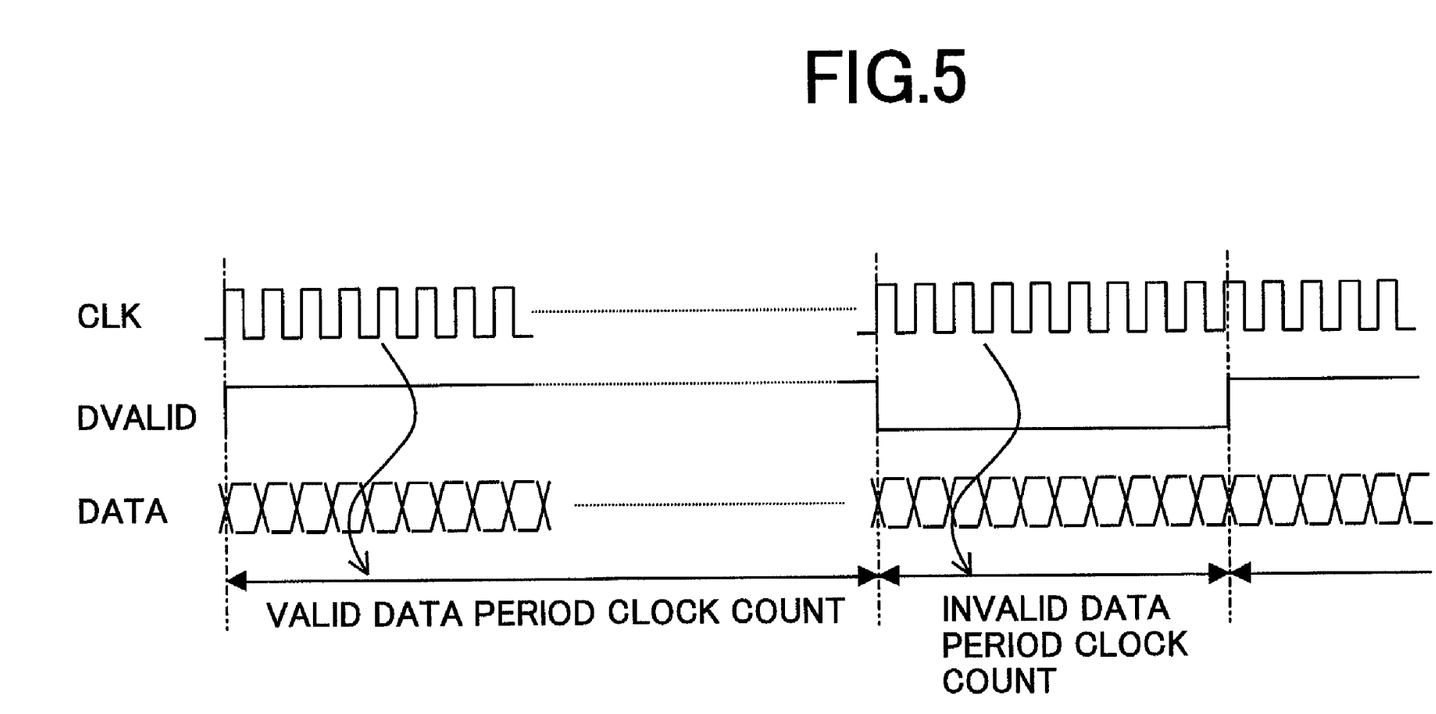
FIG. 5 is a timing chart showing an example for each of those signals represented in FIG. 4.

FIG. 5 is a timing chart showing an example for each of those signals represented in FIG. 4. The data signal DATA is the signal for transmitting MPEG-TS data, which are outputted intermittently. The reference clock signal CLK is the signal for providing a reference for the data signal DATA and giving a timing to detect the data signal DATA. The data validity signal DVALID is the signal for indicating the validity of the data signal DATA and discriminating between the period that MPEG-TS data are being transmitted (valid data period) and the period that MPEG-TS data are not being transmitted (invalid data period). Accordingly, the D-VHS data processor 2 can extract MPEG-TS data from the received data signal DATA, with using the reference clock signal CLK and the data validity signal DVALID.

The valid signal counter 14 counts the clock counts of the reference clock signal CLK for the counts inputted during each of the valid data period and the invalid data period, which are indicated by the data validity signal DVALID, and determines the lengths of the valid data period and the invalid data period and outputs them to the data rate calculator 15.

At the same time, the valid signal counter 14 detects the frequency of the reference clock signal CLK and outputs it to the data rate calculator 15. The frequency of the reference clock signal CLK can be detected, for example, by counting the reference clock signal CLK with referring to a clock signal having a known frequency higher than the reference clock signal CLK, or counting a clock signal having a known frequency lower than the reference clock signal CLK with referring to the reference clock signal CLK. However, when the frequency of the reference clock CLK is known, e.g., when the data rate detector 13 supplies the reference clock to the interface unit 1, it is unnecessary that the data rate detector 13 detects the frequency of the reference clock signal CLK.

The data rate calculator 15 calculates the data rate of MPEG-TS data, based on the percentage information of counts of the reference clock signal CLK for each of the lengths of the valid data period and the invalid data period, and the frequency information of the reference clock signal CLK, with using the following equation:

Data rate of MPEG data=(transmittable bit count in one clock period)×(frequency of clock signal)× [(counts of the reference clock signal CLK in valid data period)/{(counts of the reference clock signal CLK in valid data period)+(counts of the reference clock signal CLK in invalid data period)}].

As described heretofore, according to this embodiment, the data rate of MPEG-TS data can be calculated, by detecting the lengths of the valid data period and the invalid data period based on the data validity signal DVALID, and determining the percentage occupied by the valid data period in the total period for detection. Therefore, it is possible to select a proper recording mode to make the best use of recording tapes, wihtout providing an MPEG system layer decoder.

Embodiment 3

Figure 6:
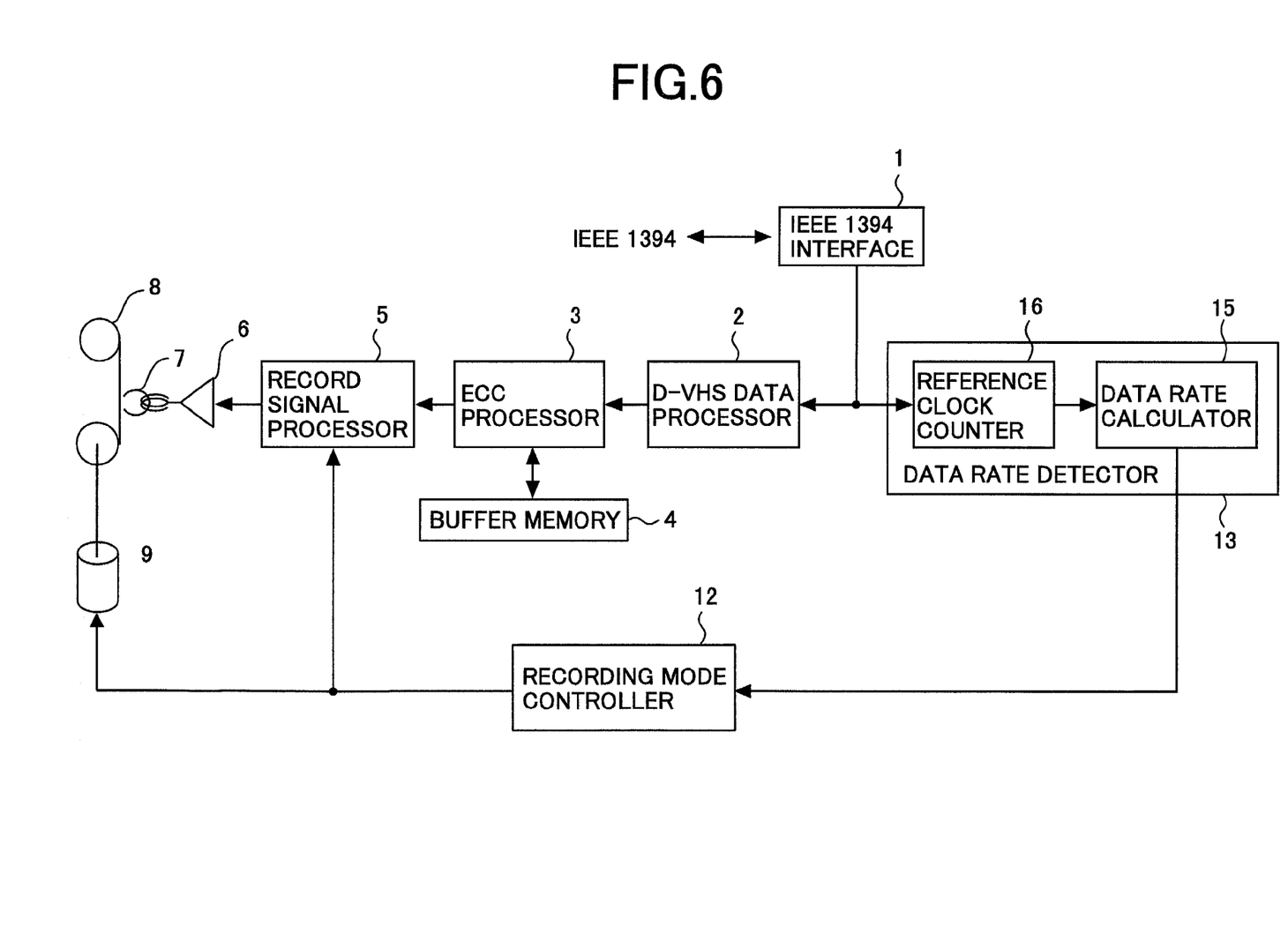
FIG. 6 is a block diagram showing a further example of the structure of an MPEG data recorder, Embodiment 3, according to the present invention.

FIG. 6 is a block diagram showing a further example of the structure of an MPEG data recorder, Embodiment 3, according to the present invention and is describing another structural example of the data rate detector 13 as in FIG. 1. The data rate detector 13 according to this embodiment is composed of a reference clock counter 16 and a data rate calculator 15.

Figure 7:
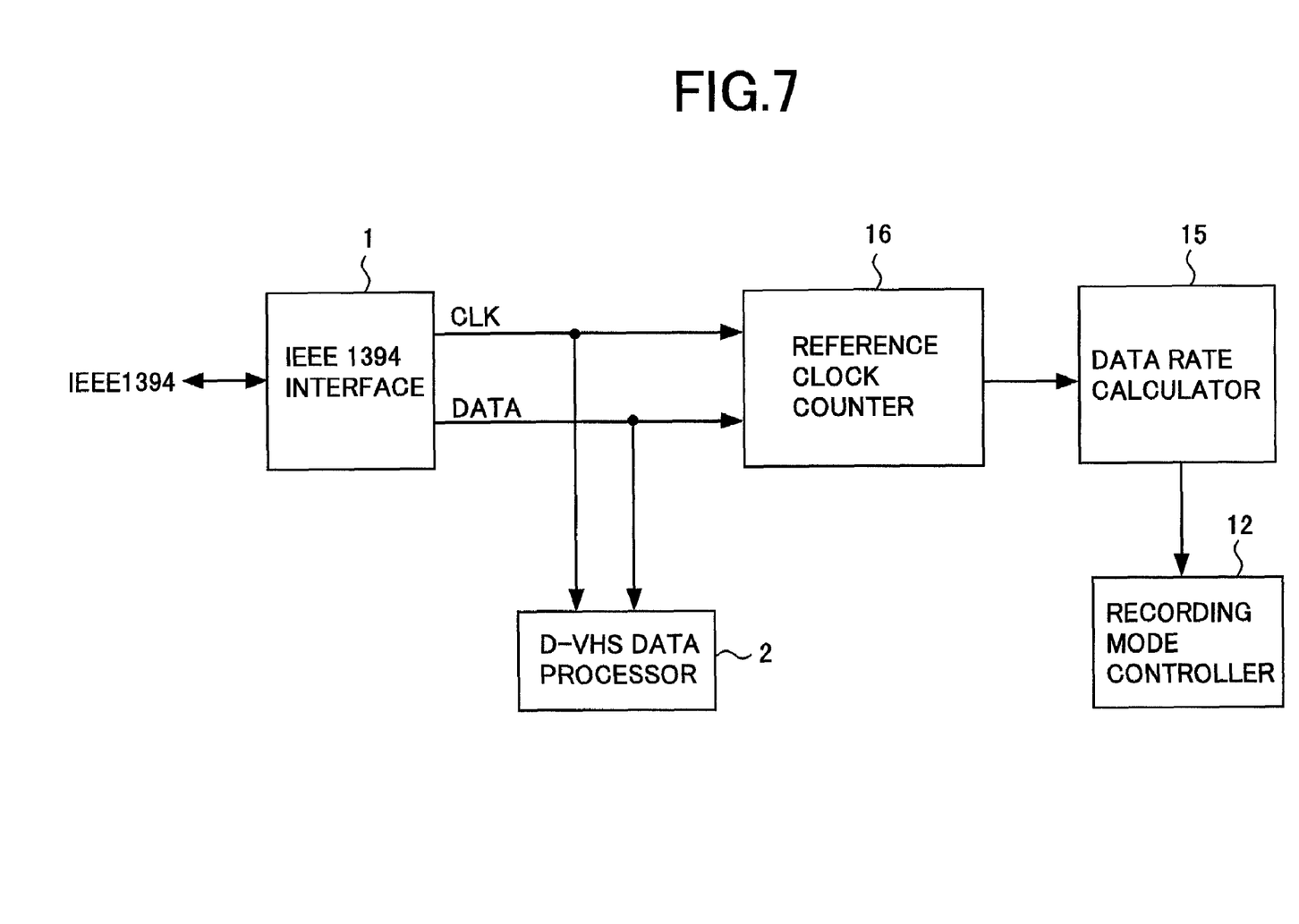
FIG. 7 is a block diagram of essential parts in FIG. 6.

FIG. 7 is a block diagram of essential parts in FIG. 6, and is showing signals, which are transmitted between the interface unit 1, the D-VHS data processor 2 and the reference clock counter 16. MPEG-TS data outputted from the interface unit 1 are transmitted as a data signal DATA and a reference clock signal CLK, those signals being outputted from the interface unit 1 to the D-VHS data processor 2 and the reference clock counter 16.

Figure 8:
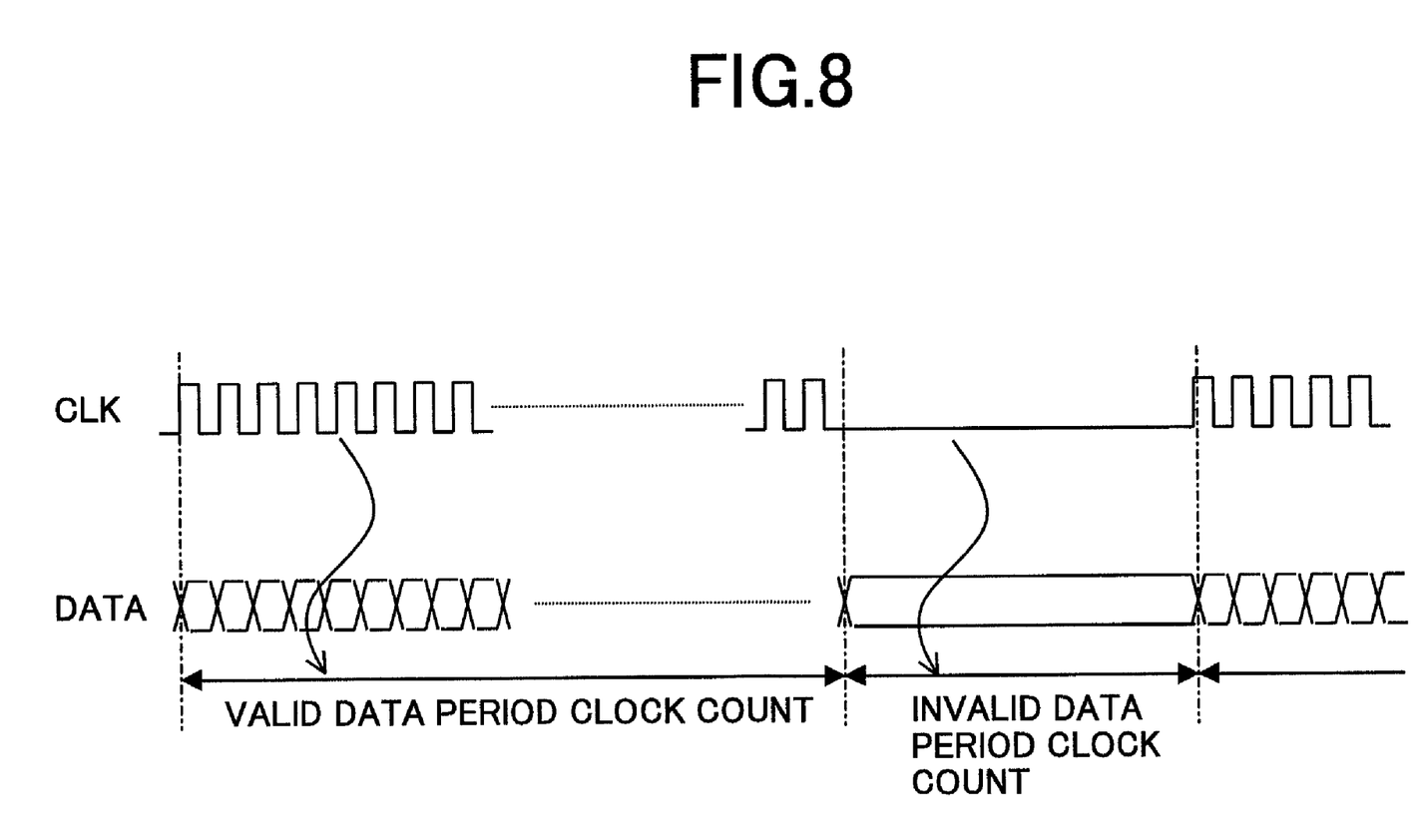
FIG. 8 is a timing chart showing an example for each of those signals represented in FIG. 7.

FIG. 8 is a timing chart showing an example for each of those signals represented in FIG. 7. The reference clock signal CLK is the signal for providing a reference for the data signal DATA, and is transmitted only during the valid data period and not transmitted during the invalid data period. Accordingly, the D-VHS data processor 2 can extract MPEG-TS data from the received data signal DATA, with using the reference clock signal CLK as a strobe signal.

The reference clock counter 16 detects the valid period, in which the reference clock CLK exists and the data signal DATA is valid, or the invalid period, in which the reference clock CLK does not exist and the data signal DATA is invalid, based on whether the reference clock signal CLK exists or not. In this case, each of the lengths of the valid data period and the invalid data period is detected as a clock count respectively, with referring to a reproduced clock, which has been reproduced from the reference clock signa, or any clock other than the reference clock. At the same time, the reference clock counter 16 detects the frequency of the reproduced clock or the other clock, by which the clock count detected, and outputs the frequency information to the data rate calculator 15.

The data rate calculator 15 calculates the data rate of MPEG-TS data, based on the percentage information of counts for each of the lengths of the valid data period and the invalid data period and the frequency information used for count detection, with using the following equation:

Data rate of MPEG data=(transmittable bit count in one clock period)×(frequency of clock signal)× [(clock signal existence period)/{(clock signal existence period)+(clock signal nonexistence period)}].

As described heretofore, according to this embodiment, the data rate of MPEG-TS data can be calculated, by detecting the lengths of the valid data period and the invalid data period based on the reference clock signal, and determining the percentage occupied by the valid data period in the total period for detection. Accordingly, it is possible to select a proper recording mode to make the best use of recording tapes, without providing an MPEG system layer decoder.

Embodiment 4

Figure 9:
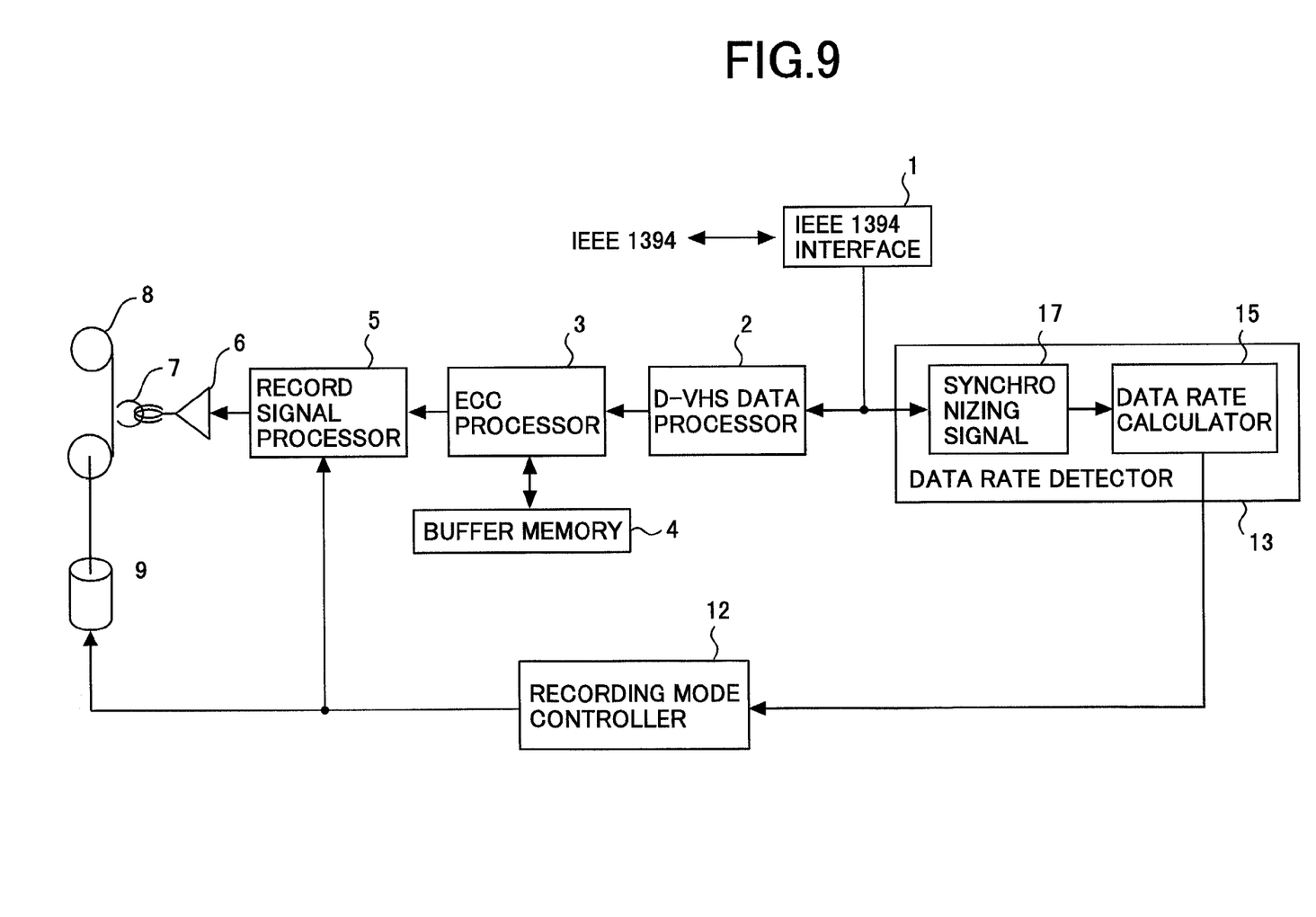
FIG. 9 is a block diagram showing a further example of the structure of an MPEG data recorder, Embodiment 4, according to the present invention.

FIG. 9 is a block diagram showing a further example of the structure of an MPEG data recorder, Embodiment 4, according to the present invention, and is describing further structural example of the data rate detector 13 in FIG. 1. The data rate detector 13 according to this embodiment is composed of a synchronizing signal detector 17 and a data rate calculator 15. The synchronizing signal detector 17 counts the number of synchronizing signals in the valid data period.

Figure 10:
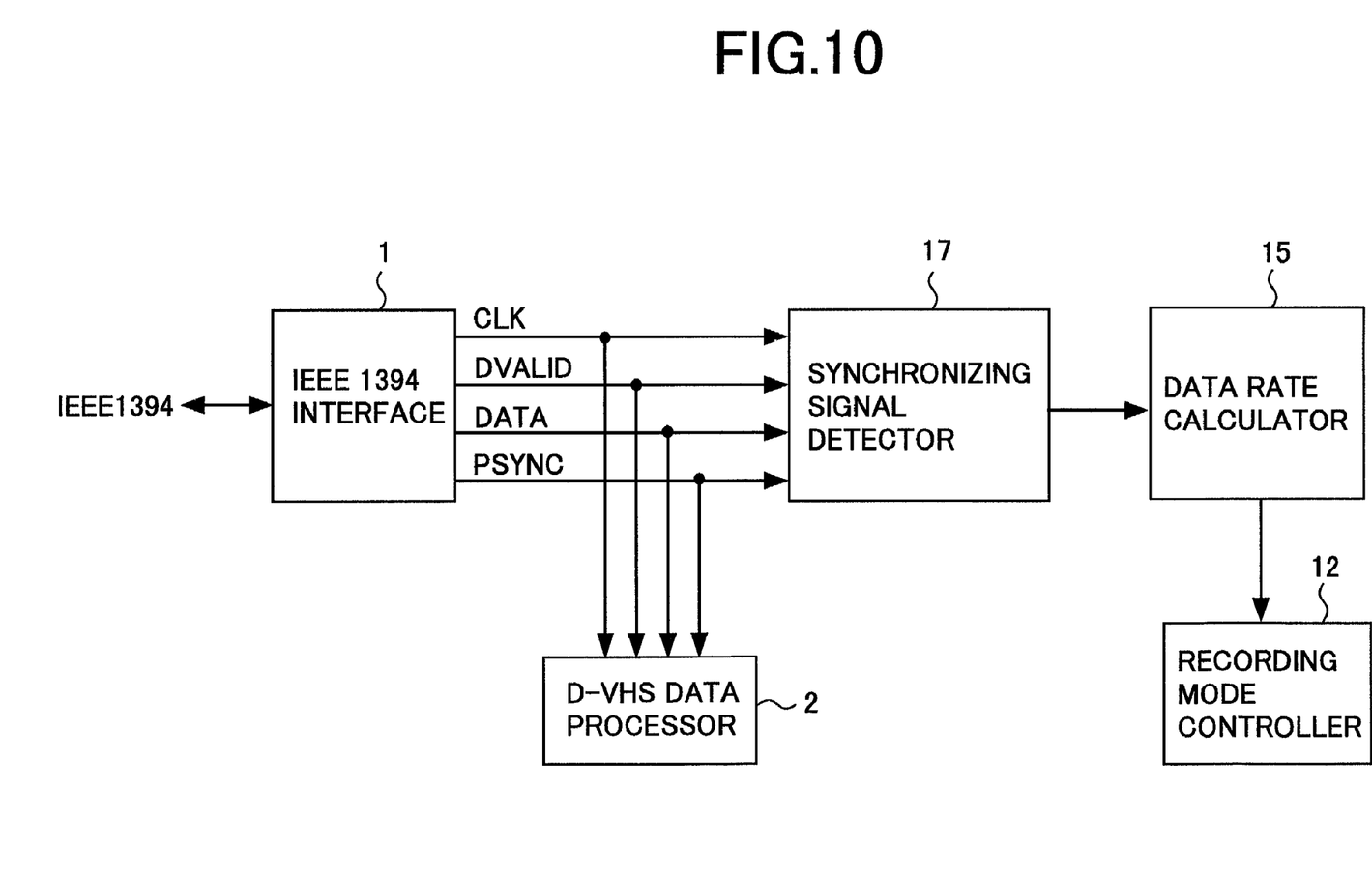
FIG. 10 is a block diagram of essential parts in FIG. 9.

FIG. 10 is a block diagram of essential parts in FIG. 9, and is showing signals, which are transmitted between the interface unit 1, the D-VHS data processor 2 and the synchronizing signal detector 17. MPEG-TS data outputted from the interface unit 1 are transmitted as a data signal DATA, a reference clock signal CLK, a data validity signal DVALID and a synchronizing signal PSYNC, those signals being outputted from the interface unit 1 to the D-VHS data processor 2 and the synchronizing signal detector 17.

Figure 11:
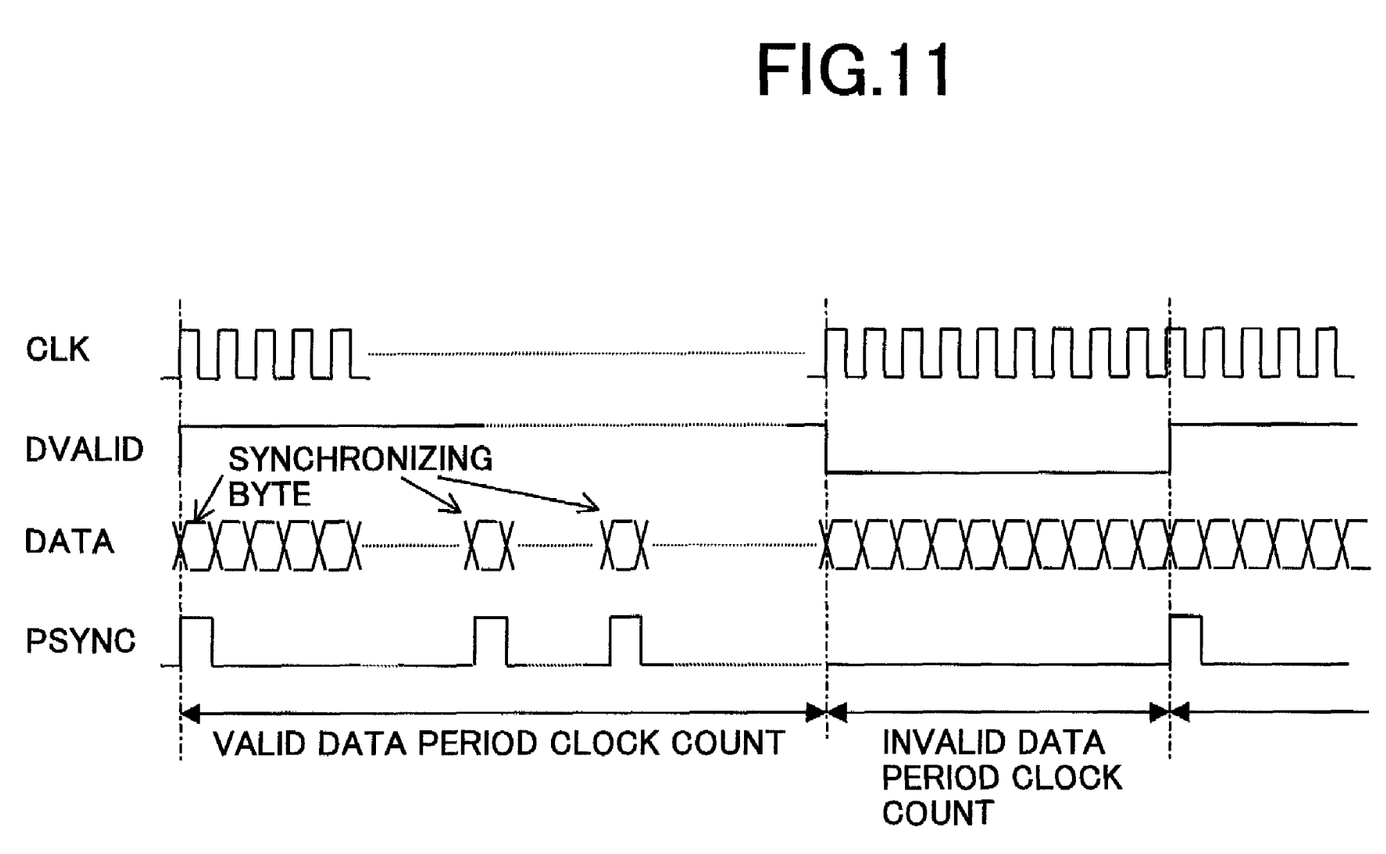
FIG. 11 is a timing chart showing an example for each of those signals represented in FIG. 10.

FIG. 11 is a timing chart showing an example for each of those signals represented in FIG. 10. The reference clock signal CLK, the data validity signal DVALID and the data signal DATA are the same as in Embodiment 2. The synchronizing signal PSYNC is a signal for indicating the timing when the synchronizing byte of MPEG-TS data is outputted from the interface unit 1.

In the isochronous communication of IEEE 1394, the data transmission of each channel is performed in every isochronous cycle, as described before, and thereby the data transfer within the same channel can be performed only once in an isochronous cycle.

Accordingly, the valid data period can occur only once in an isochronous cycle.

Since the length of an MPEG-TS packet is 188 bytes, it can be estimated that there exist MPEG-TS data of 188 bytes per synchronizing signal. Accordingly, the data rate of MPEG-TS data can be calculated by counting the number of synchronizing signals in the valid data period.

The synchronizing signal detector 17 detects the valid data period based on the data validity signal DVALID and the synchronizing signal PSYNC in the valid data period, and counts the number of synchronizing signals in a valid data period. The counted value is outputted to the data rate calculator 15.

Since the valid data period can exist only once in an isochronous cycle, as far as the interface unit 1 receives selectively only one channel, the data rate calculator 15 can calculate the data rate of MPEG-TS data, based on the values counted by the synchronizing signal detector 17, with using the following equation:

Data rate of MPEG data={(number of synchronizing signals in a valid data period)/(isochronous cycle time)}×(length of an MPEG-TS packet data)={(number of synchronizing signals in a valid data period)/125 µsec}×188 byte As described heretofore, according to this embodiment, the data rate of MPEG-TS data can be calculated by counting the synchronizing bytes in the valid data period, and thereby it is possible to make the best use of recording tapes, with a simplified circuit configuration.

Although a case where the synchronizing signal detector 17 detects the synchronizing signal PSYNC supplied from the interface unit 1 was described in this embodiment, it may be also configured so that the synchronizing signal detector 17 detects directly the synchronizing byte in the data signal DATA. In this case, it is also possible to omit the synchronizing signal PSYNC, provided that both the D-VHS data processor 2 and the data rate detector 13 can detect the synchronizing byte.

Furthermore, the reference clock signal CLK may be also configured to be outputted only during the valid data period, similarly to Embodiment 3. In this case, since the D-VHS data processor 2 and the data rate detector 13 can identify the valid data period based on the existence of the reference clock signal, the data validity signal DVALID may be omitted.

Embodiment 5

Although, in the Embodiments 1-3, the cases where the data rate of MPEG-TS data is determined by detecting a pair of the valid and invalid data periods were described, another case will be described in Embodiment 5 below, in which each of the lengths of the valid and invalid data periods is integrated for the duration longer than a pair of the valid and invalid data periods, to detect the data rate of MPEG-TS data.

The outline of structure of an MPEG data recorder according to Embodiment 5 of the present invention is similar to that as in FIG. 3 or FIG. 6. The structures and operations of the valid signal counter 14 and the reference clock counter 16 are the same as those in Embodiments 2 and 3, respectively, with the exception of the data rate calculator 15.

The data rate calculator 15 adds up the lengths of respective valid and invalid data periods, which are repeated successively within a certain duration, to produce a total valid data period and an invalid data period. That is, the total valid period produced by adding up only the valid data periods in a certain duration with skipping the invalid data periods between them, and the total invalid period produced by adding up only the invalid data periods in a certain duration with skipping the valid data periods between them, are calculated. Then, the percentages of the valid and invalid data periods in a certain duration are calculated. Accordingly, the data rate of MPEG-TS data can be calculated, by calculating the percentages of the valid and invalid data periods for a duration longer than a pair of a valid data period and an invalid data period.

The percentage occupied by the total valid data period in the sum of the total valid and invalid data periods for detection, is given by the following equation:

Percentage of valid data period=(total valid data period in a certain duration)/{(total valid data period in a certain duration+total invalid data period in a certain duration)}.

Since the number of bits transmitted per clock period of the clock signal depends on the form of connection between the interface unit 1, the D-VHS data processor 2 and the data rate detector 13, the data rate of MPEG-TS data is given by the following equation:

Data rate of MPEG data=(transmittable bit count in one clock period)×(frequency of clock signal)× [(total valid data period in a certain duration)/ {(total valid data period in a certain duration)+ (total invalid data period in a certain duration)}].

As described heretofore, according to this embodiment, the percentages of a total valid data period and a total invalid data period in a certain duration are calculated, and the data rate of MPEG-TS data can be calculated based on the percentages. Accordingly, the data rate of MPEG-TS data can be calculated with higher precision, and thereby it is possible to make the best use of recording tapes.

Although a case where the data rate calculator 15 performs the operation on the valid data period and the invalid data period to produce the total valid data period and the total invalid data period was described as an example in this embodiment, it may be also configured so that the valid signal counter 14 in FIG. 3 or the reference clock counter 16 in FIG. 6 can produce the total valid data period and the total invalid data period.

Embodiment 6

In Embodiment 6, a case where Embodiments 4 and 5 are combined together will be described. That is, in a case where the synchronizing signal detection is performed similarly to Embodiment 4, each of the lengths of the valid and invalid data periods is added up for the duration longer than a pair of the valid and invalid data periods, to detect the data rate of MPEG-TS data.

The outline of structure of an MPEG data recorder according to Embodiment 6 of the present invention is similar to that as in FIG. 9. The structures and operations of the synchronizing signal detector 17 are the same as those in Embodiments 4, while the operation of the data rate calculator 15 is the same as that in Embodiments 5.

Since a synchronizing signals exists in each MPEG-TS packet and the size of an MPEG-TS packet is 188 bytes, the product of the number of synchronizing signals, which have been detected in a certain duration for detection, multiplied by 188 is equal to the bytes of MPEG-TS data existing in the certain duration:

(Bytes of valid data in a certain duration)=(number of synchronizing signals detected in a certain duration)×188.

The data rate of MPEG-TS data can be obtained by dividing the amount of detected data by the certain duration for detection, and given by the following equation:

Data rate of MPEG data={(number of synchronizing signals detected)×188/(duration for detection)}

In this case, although the duration for detection (a certain duration in above description) can be selected arbitrarily, it must be longer than 125 μsec, an isochronous cycle. The calculation of the data rate of MPEG-TS data could be made easier, by selecting the duration for detection to be integral times of an isochronous cycle.

As described heretofore, also with a method using the synchronizing signal detection according to this embodiment, the percentages of a total valid data period and a total invalid data period in a certain duration are calculated, and the data rate of MPEG-TS data can be calculated based on the percentages.

What is claimed is:

1. An MPEG data recorder comprising:
   an interface that receives data packets from a digital transmission line transmitting MPEG data in real time, and extracts predetermined MPEG data from received packets and outputs the extracted MPEG data as a data signal;
   a data rate detector that determines a data rate of the MPEG data based on a valid data period, during which the data signal is outputted from the interface; and
   a recording mode selector that selects a recording mode based on the determined data rate, wherein, the interface outputs a data signal as an MPEG packet having a predetermined amount of data, and outputs a synchronizing signal in synchronization with the MPEG packet; and
   the data rate detector counts the synchronizing signals outputted in a predetermined duration for detection, and detects the data rate of MPEG data based on the counted value.

2. The MPEG data recorder as claimed in claim 1, wherein, the data rate detector adds up valid data periods in a predetermined period for detection including two or more valid data periods, and detects the data rate of MPEG data based on the added-up value.

3. The MPEG data recorder as claimed in claim 1, the interface is an IEEE 1394 interface unit, which performs an isochronous communication through an IEEE 1394 link, and extracts MPEG data of a predetermined channel from the received packet.

4. The MPEG data recorder as claimed in claim 3, wherein, the data rate detector adds up valid data periods in a predetermined period for detection including two or more isochronous cycles, and detects the data rate of MPEG data based on the added-up value.

5. An MPEG data recorder comprising:
   an interface that receives data packets from a digital transmission line transmitting MPEG data in real time, and extracts predetermined MPEG data relating to the same content from received packets and outputs the extracted MPEG data as a data signal;
   a data rate detector that determines a data rate of the MPEG data based on a valid data period, during which the data signal is outputted from the interface;
   a recording mode selector that selects a recording mode based on the determined data rate; and
   a motor driver that controls the speed of a recording media based on the selected recording mode, wherein, the data rate detector adds up valid data periods in a predetermined period for detection including two or more valid data periods, and detects the data rate of MPEG data based on the added-up value.

6. An MPEG data recorder comprising:
   an interface that receives data rackets from a digital transmission line transmitting MPEG data in real time, and extracts predetermined MPEG data relating to the same content from received packets and outputs the extracted MPEG data as a data signal;
   a data rate detector that determines a data rate of the MPEG data based on a valid data period, during which the data signal is outputted from the interface;
   a recording mode selector that selects a recording mode based on the determined data rate;
   a motor driver that controls the speed of a recording media based on the selected recording mode wherein,
   the interface outputs a transmission control signal when the interface outputs a data signal,
   the data rate detector determines a percentage occupied by the valid data period, by detecting the transmission control signal; and
   the data rate detector adds up valid data periods in a predetermined period for detection including two or more valid data periods, and detects the data rate of MPEG data based on the added-up value.

7. An MPEG data recorder comprising:
   an interface that receives data packets from a digital transmission line transmitting MPEG data in real time, and extracts predetermined MPEG data from received packets and outputs the extracted MPEG data as a data signal;
   a data rate detector that determines a data rate of the MPEG data based on a valid data period, during which the data signal is outputted from the interface; and a recording mode selector that selects a recording mode based on the determined data rate, wherein, the interface outputs a data signal as an MPEG packet having a predetermined amount of data, and outputs a synchronizing signal in synchronization with the MPEG packet; and the data rate detector counts the synchronizing signals outputted in a predetermined duration for detection, and detects the data rate of MPEG data based on the counted value;

wherein the interface is an IEEE 1394 interface unit, which performs an isochronous communication through an IEEE 1394 link, and extracts MPEG data of a predetermined channel from the received packet, and, wherein, the data rate detector adds up valid data periods in a predetermined period for detection including two or more isochronous cycles, and detects the data rate of MPEG data based on the added-up value.

8. An MPEG data recorder comprising:

an IEEE 1394 interface unit, which performs an isochronous communication through an IEEE 1394 link that receives data packets from a digital transmission line transmitting MPEG data in real time, and extracts predetermined MPEG data relating to the same content from received packets and outputs the extracted MPEG data as a data signal and outputs a transmission control signal when the interface outputs a data signal;

a data rate detector that determines a data rate of the MPEG data based on a valid data period, during which the data signal is outputted from the interface and determines a percentage occupied by the valid data period, by detecting the transmission control signal and adds up valid data periods in a predetermined period for detection including two or more isochronous cycles, and detects the data rate of the MPEG data based on the added-up value;

a recording mode selector that selects a recording mode based on the determined data rate; and a motor driver that controls the speed of a recording media based on the selected recording mode.

* * * * *